(12) United States Patent
Kanenari et al.

(10) Patent No.: US 8,517,063 B2
(45) Date of Patent: Aug. 27, 2013

(54) FLAT TIRE SEALANT STORAGE CONTAINER AND FLAT TIRE REPAIR DEVICE

(75) Inventors: Daisuke Kanenari, Hiratsuka (JP); Takumi Sekiguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 288 days.

(21) Appl. No.: 13/123,812

(22) PCT Filed: Oct. 8, 2009

(86) PCT No.: PCT/JP2009/067575
§ 371 (c)(1),
(2), (4) Date: Apr. 12, 2011

(87) PCT Pub. No.: WO2010/047231
PCT Pub. Date: Apr. 29, 2010

(65) Prior Publication Data
US 2011/0192492 A1 Aug. 11, 2011

(30) Foreign Application Priority Data

Oct. 20, 2008 (JP) ................ 2008-269959
Nov. 19, 2008 (JP) ................ 2008-295758

(51) Int. Cl.
*B65B 31/00* (2006.01)
(52) U.S. Cl.
USPC ............ 141/38; 141/67; 141/105; 141/114; 141/330; 152/415; 81/15.6

(58) Field of Classification Search
USPC ............ 141/38, 67, 100, 105, 114, 231, 313, 141/329, 330; 152/502, 415; 81/15.6
See application file for complete search history.

(56) References Cited

U.S. PATENT DOCUMENTS

| | | | |
|---|---|---|---|
| 6,964,284 B2 * | 11/2005 | Eckhardt | 141/38 |
| 6,968,869 B2 * | 11/2005 | Eckhardt | 141/38 |
| 2002/0104584 A1 * | 8/2002 | Spero et al. | 141/329 |
| 2004/0216806 A1 * | 11/2004 | Eckhardt | 141/38 |
| 2008/0092984 A1 * | 4/2008 | Marini | 141/38 |

FOREIGN PATENT DOCUMENTS

| | | |
|---|---|---|
| JP | H1-124162 U | 8/1989 |
| JP | 3026757 U | 5/1996 |
| JP | 2005-145076 A | 6/2005 |
| JP | 3140227 U | 3/2008 |
| JP | 2008-173918 A | 7/2008 |

\* cited by examiner

*Primary Examiner* — Jason K Niesz
(74) *Attorney, Agent, or Firm* — Global IP Counselors, LLP

(57) ABSTRACT

A flat tire sealant storage container is provided for a flat tire repair device in a formed in a simple configuration which enables the container to be stably secured. The flat tire sealant storage container includes an air inflow pipe for injecting compressed air under pressure into the container filled with a flat tire sealant and a sealant outlet discharge pipe for discharging the flat tire sealant under pressure to the outside of the container. The flat tire sealant storage container further includes an attachable and detachable fixing device formed on the outer surface of the container. When the container is secured to an external object by the fixing device, the inlet of the sealant outlet discharge pipe is positioned at the inner lower part of the container.

15 Claims, 8 Drawing Sheets

FLAT TIRE SEALANT STORAGE CONTAINER AND FLAT TIRE REPAIR DEVICE

CROSS-REFERENCE TO RELATED APPLICATIONS

This U.S. National stage application claims priority under 35 U.S.C. §119(a) to Japanese Patent Application No. 2008-269959, filed in Japan on Oct. 20, 2008 and Japanese Patent Application No. 2008-265758, filed in Japan on Nov. 19, 2008, the entire contents of which are hereby incorporated herein by reference.

TECHNICAL FIELD

The present invention relates to a flat tire sealant storage container and a flat tire repair device. More specifically, the present invention relates to a flat tire sealant storage container formed in a simple configuration enabling the container to be stably secured and a flat tire repair device having the container.

BACKGROUND ART

There has recently been in widespread use a flat tire repair kit which, when a pneumatic tire (hereinafter simply called the "tire") goes flat, injects a flat tire sealant into the flat tire, fills the flat tire sealant into a puncture hole, and then increases the pressure in the tire to a predetermined specified pressure. The use of such a flat tire repair kit eliminates the need to mount a spare tire on a vehicle, thereby enabling resource saving and vehicle weight saving. There is also an advantage that a space provided in the vehicle to mount the spare tire can be effectively used for other purposes.

FIG. 18 illustrates a conventional flat tire repair kit. In this flat tire repair kit, a pressure tight container 1 for storing a flat tire sealant is provided with an air inflow section 3 and a sealant discharge section 4, and hoses 12a and 12b are connected to the air inflow section 3 and the sealant discharge section 4, respectively. Compressed air is supplied to the hose 12a from a compressor C and is injected under pressure into the container 1 through the air inflow section 3. The pressure of the compressed air pushes the flat tire sealant in the container 1 out into the sealant discharge section 4, thereby injecting the flat tire sealant into a tire T through the hose 12b.

In the flat tire repair kit described above, the container 1 needs to be secured in such a stable position that the container 1 may not fall or lean while the flat tire sealant is supplied to the tire. As a conventional countermeasure therefor, Japanese patent application Kokai publication No. 2005-39126 describes that multiple legs extending in a radial fashion are provided to a lower end of a cap attached to a lower part of a container for storing a sealant.

The legs as described above enable the container to be stably placed on a level road surface. On an inclined road surface, a rough road and the like, however, the legs have a problem that the container may turn over, for example, and thus cannot be stably placed.

SUMMARY

An object of the present invention is to provide a flat tire sealant storage container which solves the above problem and which is formed in a simple configuration enabling the container to be stably secured even on an inclined or rough road surface, and a flat tire repair device having the container.

A flat tire sealant storage container of the present invention for achieving the above-described object is a flat tire sealant storage container including: an air inflow section for injecting compressed air under pressure into the container filled with a flat tire sealant; and a sealant discharge section for discharging the flat tire sealant under pressure to the outside of the container, the flat tire sealant storage container characterized in that a fixing device attachable to and detachable from an external object is provided on the outer surface of the container, and when the container is secured to the external object by means of the fixing device, an inlet of the sealant discharge section is positioned at an inner lower part of the container.

Moreover, it is preferable that the flat tire sealant storage container having the above configuration is configured as described in the following (1) to (8).

(1) The fixing device is provided on a lower side of the container and is secured to the external object.

(2) A cap is provided to be detachably attached an opening of the container, the air inflow section and the sealant discharge section are equipped with the cap, and the fixing device is provided on an outer surface of the cap.

(3) A sealing film is equipped with the opening of the container to seal the opening, the cap is configured to be fitted from the outside of the sealing film, a leading end of an outlet of the air inflow section and a leading end of the inlet of the sealant discharge section are each formed into an acute-angled shape, and the leading end of the outlet and the leading end of the inlet are configured to break the sealing film when the cap is fitted.

(4) A laterally projecting spring hook is formed on an inner wall of the cap, and the spring hook is configured to be engaged with an engagement groove provided in an outer wall of the opening, when the cap is fitted to the opening of the container.

(5) Laterally projecting spring hooks are formed on the leading end of the outlet of the air inflow section and the leading end of the inlet of the sealant discharge section, respectively, and the spring hooks are configured to be engaged with an engagement groove provided in an inner wall of the opening, when the cap is fitted to the opening of the container.

(6) The attachable and detachable fixing device is a sucker capable of attaching to the external object.

(7) The attachable and detachable fixing device includes a pair of a hook-and-loop fastener provided on the container side and a hook-and-loop fastener provided on the external object side.

(8) A portion, of the container, where the hook-and-loop fastener on the container side is provided is set to be a flat surface.

Moreover, it is preferable that a flat tire repair device of the present invention having the flat tire sealant storage container is configured as described in the following (9) to (11).

(9) The flat tire repair device includes: the flat tire sealant storage container having the above-described configuration (6); a compressor for injecting compressed air under pressure into the air inflow section, wherein a smooth surface to which the sucker is attached is provided in an outer surface of a case of the compressor.

(10) The smooth surface is formed of a sticker made of a smooth material being attached to the case surface of the compressor.

(11) A pattern and/or a sentence indicating a fixing position of the sucker is displayed on the sticker.

Moreover, it is preferable that another flat tire repair device of the present invention having the flat tire sealant storage container is configured as described in the following (12) to (14).

(12) The flat tire repair device includes: the flat tire sealant storage container having the configuration (7) or (8); and a compressor for injecting compressed air under pressure into the air inflow section. In the flat tire repair device, the hook-and-loop fastener on the external object side is provided on an outer surface of a case of the compressor.

(13) Second hook-and-loop fasteners for storage, which form another pair independent of the pair of hook-and-loop fasteners, are provided on a side surface of the flat tire sealant storage container and a side surface of the case of the compressor.

(14) Combinations of hook fasteners and loop fasteners making up the hook-and-loop fasteners and the second hook-and-loop fasteners for storage have a reverse relationship to each other between the flat tire sealant storage container and the case of the compressor.

In the present invention, the flat tire sealant storage container comprises an air inflow section for injecting compressed air under pressure into a container filled with a flat tire sealant and a sealant discharge section for discharging the flat tire sealant under pressure to the outside of the container. The flat tire sealant storage container further comprises a fixing device which is provided on the outer surface of the container and which is attachable to and detachable from an external object, and the container is secured to the external object by means of the fixing device. Accordingly, the flat tire sealant storage container enables the container to be stably and reliably secured by a simple configuration even on an inclined or rough road surface. Moreover, when the container is secured to the external object by means of the fixing device, the inlet of the sealant discharge section is positioned at the inner lower part of the container, thereby enabling the flat tire sealant to be reliably discharged.

DETAILED DESCRIPTION OF THE EMBODIMENTS

Figure 1:
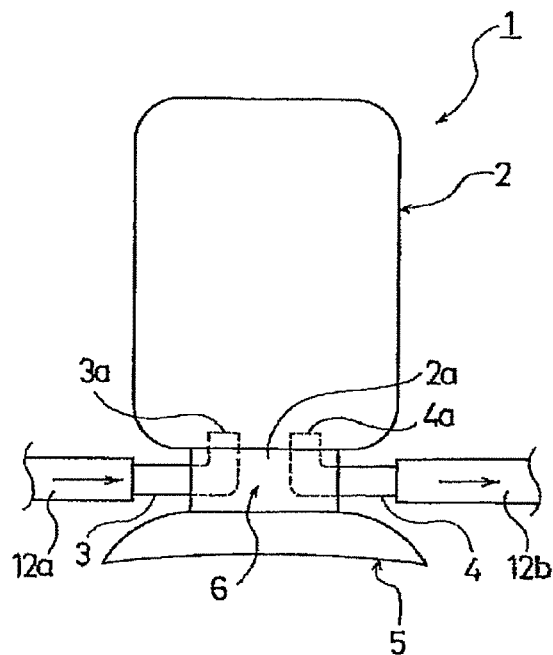
FIG. 1 is a schematic view showing a flat tire sealant storage container according to an embodiment of the present invention.

FIG. 1 is a schematic view showing a flat tire sealant storage container according to an embodiment of the present invention.

Figure 12:
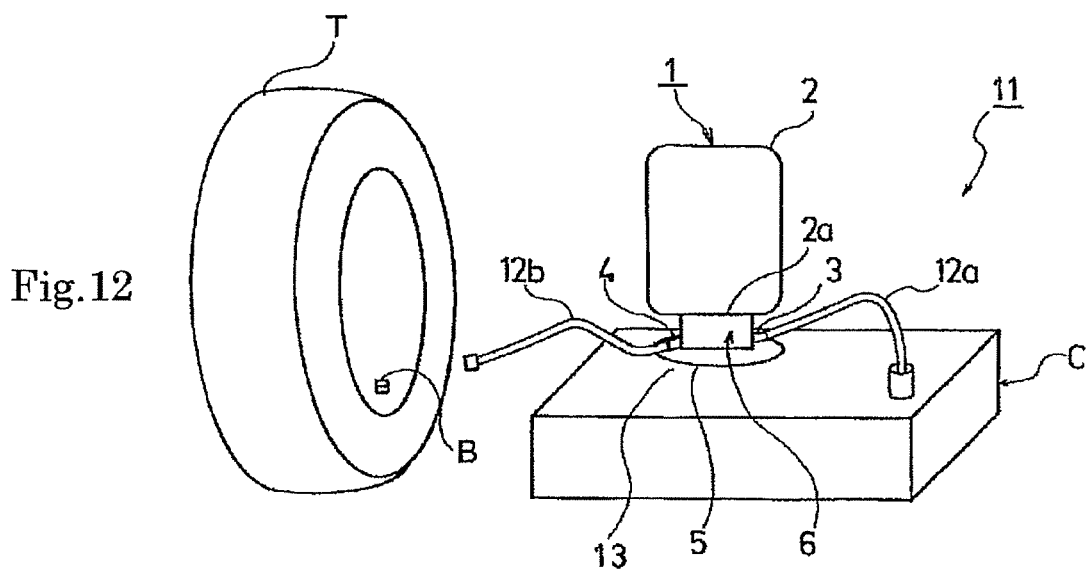
FIG. 12 is a schematic view showing a usage state of a flat tire repair device according to an embodiment of the present invention.

A container 1 includes a main body 2 that at least partially defines an interior space that stores a flat tire sealant. The main body 2 has an opening 2a provided in its lower side relative to when the container 1 is in a usage state as seen in FIG. 12. The main body 2 includes a cap 6 detachably secured to a vessel portion of the main body 2. The cap 6 is attached to the vessel portion of the main body 2 to cover an opening 2a provided in a lower side of the vessel portion of the main body 2. In the opening 2a having the cap 6 attached thereto, there are provided an air inflow pipe or section 3 and a sealant discharge pipe or section 4. The air inflow pipe or section 3 is configured to be connected to a compressor C (FIG. 12) through a hose 12a. As seen in FIG. 12, the sealant discharge pipe or section 4 is configured to be connected to flat tire T through a hose 12b. The air inflow section 3 and the sealant discharge section 4 are provided penetrating wall surfaces of the cap 6 and the opening 2a. On a top surface of the cap 6 in the lower part of the container 1 thus configured, a sucker 5 attachable to and detachable from an external object is provided as a fixing device.

The provision of the sucker 5 that can stick to the external object as the fixing device on the outer surface of the container 1 as described above enables the flat tire sealant storage container 1 to be easily and stably secured on the external object by the sucker 5. As a result, flat tire repair work can be smoothly performed. Note that when the sucker 5 is provided as shown in FIG. 1, the sucker 5 is configured to stick to a smooth surface of the external object.

When the container 1 is secured to the external object as described above, the sealant discharge section 4 needs to have its inlet 4a positioned at an inner lower part of the container 1. Failure to dispose the inlet 4a at the inner lower part of the container 1 results in a situation where not all the flat tire sealant can be injected into the tire.

The sucker 5 may be attached to any position of the container 1 as long as it is on the outer surface of the container 1, but may preferably be provided on a lower outer surface of the container 1 when the container 1 is set vertically upright. That is, the sucker 5 may be provided so as to be positioned at the lower part of the container 1 when the container 1 is secured in the upright state to the external object. The provision of the sucker 5 at the lower part of the container 1 enables the container 1 to be more reliably secured by the weight of the container 1. Also in this event, the inlet 4a of the sealant discharge section 4 is positioned at the inner lower part of the container 1.

Figure 2:
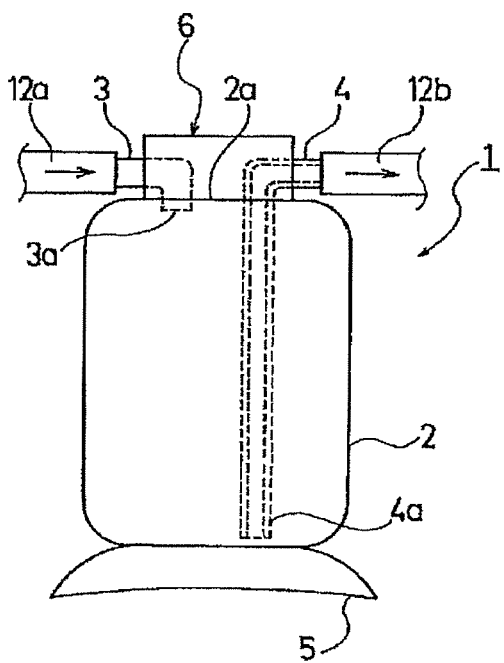
FIG. 2 is a schematic view of a flat tire sealant storage container according to another embodiment of the present invention.

FIG. 2 shows an embodiment in which a container 1 is set upright while the cap 6 side is set to be the upper side of the container 1. In this embodiment, the sucker 5 needs to be attached to a bottom surface of the container 1, and, out of an air inflow section 3 and a sealant discharge section 4 equipped with the cap 6, the sealant discharge section 4 needs to have its inlet 4a extend to the lower part of the container 1.

Figure 3:
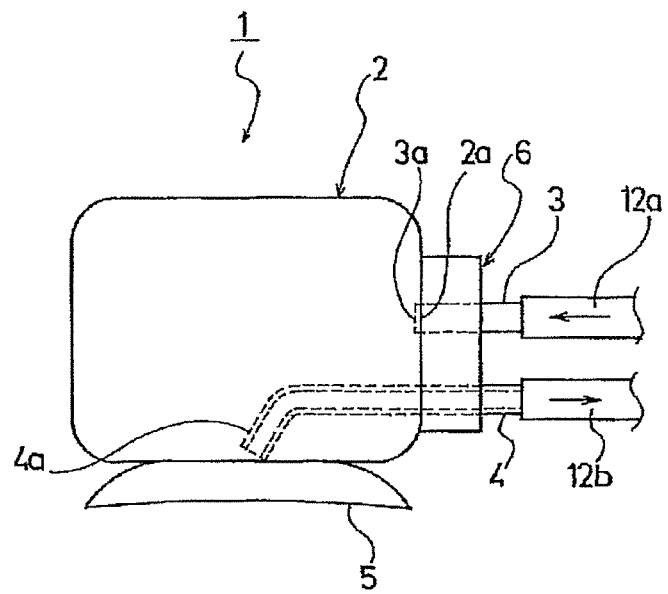
FIG. 3 is a schematic view of a flat tire sealant storage container according to still another embodiment of the present invention.

FIG. 3 shows an embodiment in which a container 1 is transversely disposed. In this embodiment, a sucker 5 is secured to a side surface of a main body 2, and, out of an air inflow section 3 and a sealant discharge section 4 equipped with the cap 6, the sealant discharge section 4 needs to have its inlet 4a positioned at a lower part of the transversely disposed main body.

In either case, the air inflow section 3 and the sealant discharge section 4 may be provided in any positions, whereas the inlet 4a of the sealant discharge section 4 needs to be always positioned at an inner lower part of the container 1.

Embodiments shown in FIGS. 4 to 6 show modified examples of the embodiment shown in FIG. 1, respectively.

In a container 1 storing a sealant therein, generally, a sealing film 8 is attached covering an opening 2a in a main body 2 to prevent leakage and deterioration of the flat tire sealant. As a result, removal of the sealing film 8 from the main body 2 is required at the beginning of use.

Figure 4A:
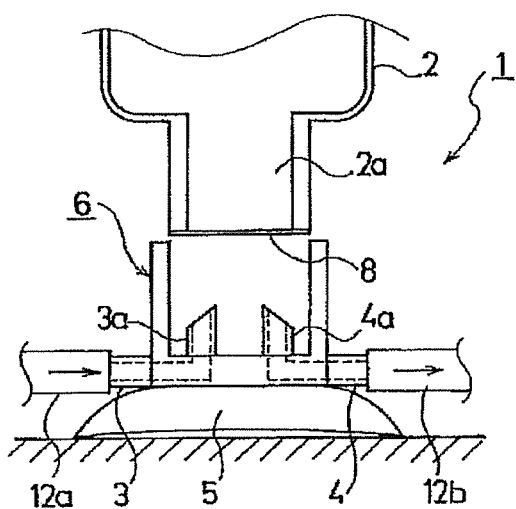
FIGS. 4A and 4B are cross-sectional views of a cap and a main body according to a modified example of the embodiment shown in FIG. 1.
Figure 4B:
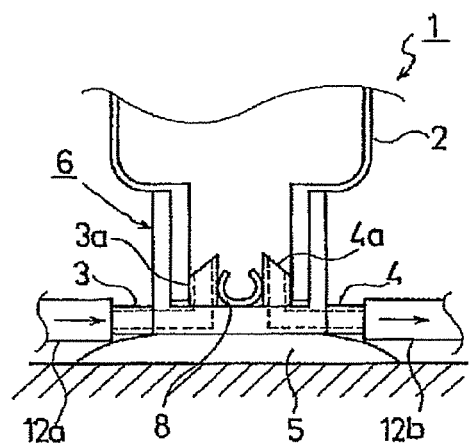

In the embodiment shown in FIGS. 4A and 4B, a leading end of an outlet 3a of an air inflow section 3 in a cap 6 and a leading end of an inlet 4a of a sealant discharge section 4 are each formed into an acute-angled shape. This configuration enables a sucker 5 to be automatically secured by suction to the surface of the external object, without adding, in particular, the work to break the sealing film 8, by pressing down the opening 2a of the main body 2 while inserting the opening 2a into the cap 6 in a state where the cap 6 is placed on the surface of the external object with the sucker 5 positioned on the lower side during securing of the container 1 to the external object. In other words, securing of the container 1 to the external object by means of the sucker 5 and attachment of the cap 6 can be simultaneously performed.

Note that when the main body 2 and the cap 6 are combined by breaking the sealing film 8 as described above, a check valve may be provided in the air inflow section 3 to prevent the flat tire sealant from flowing backward to the compressor C.

Figure 5A:
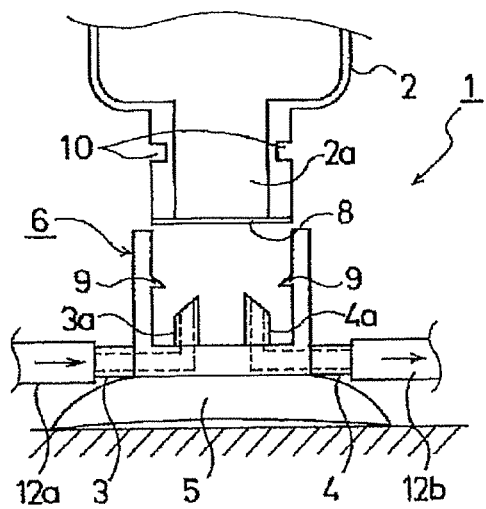
FIGS. 5A and 5B are cross-sectional views of a cap and a main body according to another modified example of the embodiment shown in FIG. 1.
Figure 5B:
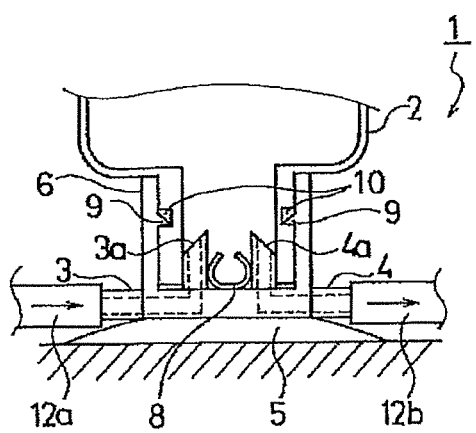

In the embodiment shown in FIGS. 5A and 5B, a laterally projecting spring hook 9 is formed on an inner wall of the cap 6, and an engagement groove 10 is provided in an outer wall of the opening 2a of the main body 2, in addition to the configuration shown in FIGS. 4A and 4B. The engagement groove 10 in the outer wall of the opening 2a is set to correspond to the position of the spring hook 9 when the opening 2a and the cap 6 are fitted to each other at a normal position. This configuration enables securing of the container 1 to the external object by means of the sucker 5, breaking of the sealing film 8 with the leading end of the outlet 3a of the air inflow section 3 and the leading end of the inlet 4a of the sealant discharge section 4, and attachment of the cap 6 to be simultaneously performed by pressing down the opening 2a of the main body 2 while inserting the opening 2a into the cap 6 in a state where the cap 6 is placed on the surface of the external object with the sucker 5 positioned on the lower side, as in the case of FIGS. 4A and 4B. Furthermore, fitting between the spring hook 9 and the engagement groove 10 enables the main body 2 and the cap 6 to be reliably secured to each other.

Figure 6A:
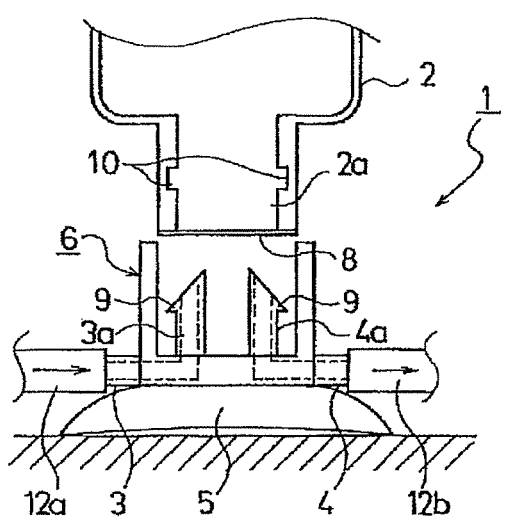
FIGS. 6A and 6B are cross-sectional views of a cap and a main body according to still another modified example of the embodiment shown in FIG. 1.
Figure 6B:
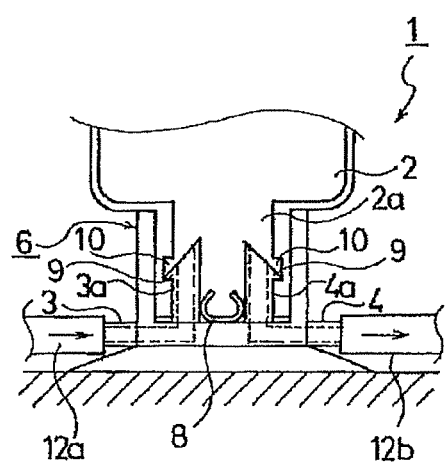

In the embodiment shown in FIGS. 6A and 6B, a positional relationship between spring hooks 9 and an engagement groove 10 is reversed from that in the embodiment shown in FIGS. 5A and 5B. The spring hooks 9 are provided not on the inner wall of the cap 6 but on the acute-angled leading ends of the outlet 3a of the air inflow section 3 and of the inlet 4a of the sealant discharge section 4, respectively, so that the spring hooks project laterally. The engagement groove 10 is formed in the inner wall of the opening 2a. This configuration enables securing of the container 1 to the external object by means of the sucker 5, breaking of the sealing film 8, and attachment of the cap 6 to be simultaneously performed, and also enables the main body 2 and the cap 6 to be reliably secured to each other, as in the case of FIGS. 5A and 5B.

Figure 7A:
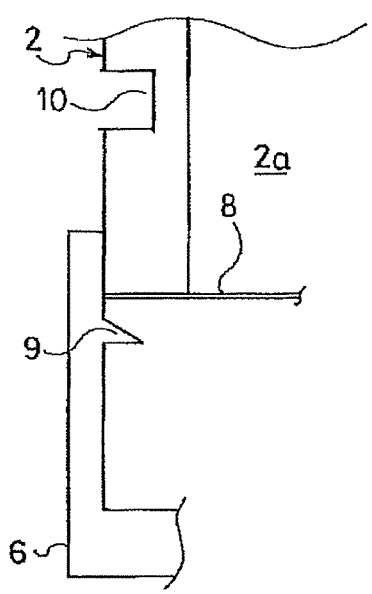
FIGS. 7A to 7C are explanatory views showing a method for fitting the main body to the cap shown in FIG. 4.
Figure 7B:
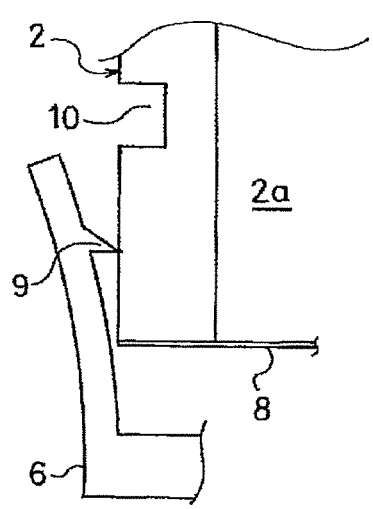
Figure 7C:
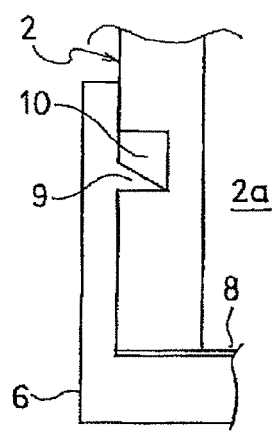

FIGS. 7A to 7C show a method for fitting the spring hook 9 to the engagement groove 10 when the spring hook 9 is provided on the inner wall of the cap 6 and the engagement groove 10 is formed in the outer wall of the opening 2a of the main body 2 as shown in FIGS. 5A and 5B.

As shown in FIG. 7A, the spring hook 9 on the cap 6 side stands upright before coming into contact with the outer wall of the opening 2a. Pressing down of the main body 2 causes the spring hook 9 to abut against the outer wall of the opening 2a, the spring hook 9 is bent as shown in FIG. 7B. When the main body 2 and the cap 6 are fitted to each other in a completely normal positional relationship by further pressing down the main body 2, the spring hook 9 on the cap 6 side is fitted into the engagement groove 10 provided in the outer wall of the opening 2a, as shown in FIG. 7C. A shape of the spring hook 9, a position thereof and the number thereof are not particularly limited as long as the spring hook has enough spring to deform as shown in FIGS. 7A to 7C and fit into the engagement groove 10 on the main body 2 side.

When the sucker 5 is provided as the fixing device, a shape and a size of the sucker 5 are not particularly limited as long as the sucker can secure the container 1 to the external object. At least one sucker 5 may be provided, but multiple suckers may be used to secure the container 1.

Figure 8:
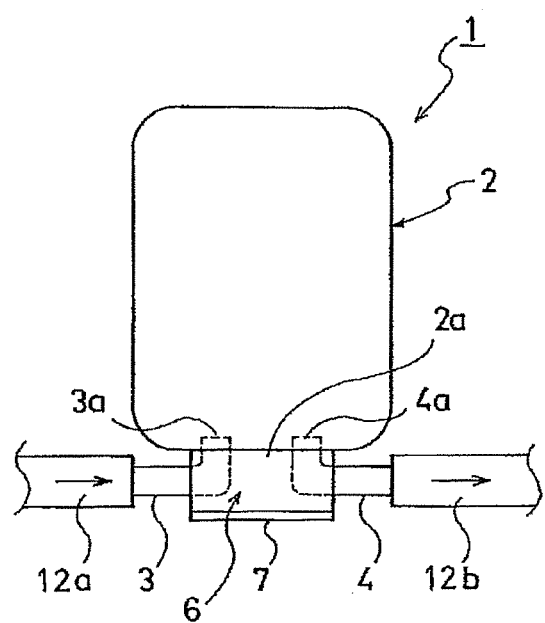
FIG. 8 is a schematic view of a flat tire sealant storage container according to another embodiment of the present invention.

FIG. 8 shows another embodiment in which a hook-and-loop fastener 7 is provided on a top surface of the cap 6, instead of the sucker 5 in FIG. 1 described as the fixing device.

When the hook-and-loop fastener 7 is provided on the outer surface of the container 1 as the fixing device, another hook-and-loop fastener which is detachably engaged and paired up therewith is attached to the surface of the external object (not shown). The flat tire sealant storage container 1 can be easily and stably secured on the external object also when the hook-and-loop fastener 7 is used as the fixing device. As a result, flat tire repair work can be smoothly performed.

Also when the hook-and-loop fastener 7 is used as the fixing device as described above, the inlet 4a of the sealant discharge section 4 needs to be positioned at the inner lower part of the container 1 as shown in FIG. 8 when the container 1 is secured to the external object, as in the case of the sucker 5 shown in FIG. 1.

The hook-and-loop fastener 7 may be attached to any position of the container 1 as long as it is on the outer surface of the container 1, but may preferably be provided on a lower outer surface of the container 1 when the container is set vertically upright. That is, the hook-and-loop fastener 7 may be provided so as to be positioned at the lower part of the container 1 when the container 1 is secured in the upright state to the external object. The provision of the hook-and-loop fastener 7 at the lower part of the container 1 enables the container 1 to be more reliably secured by the weight of the container 1. Also in this event, the inlet 4a of the sealant discharge section 4 is positioned at the inner lower part of the container 1.

Figure 9:
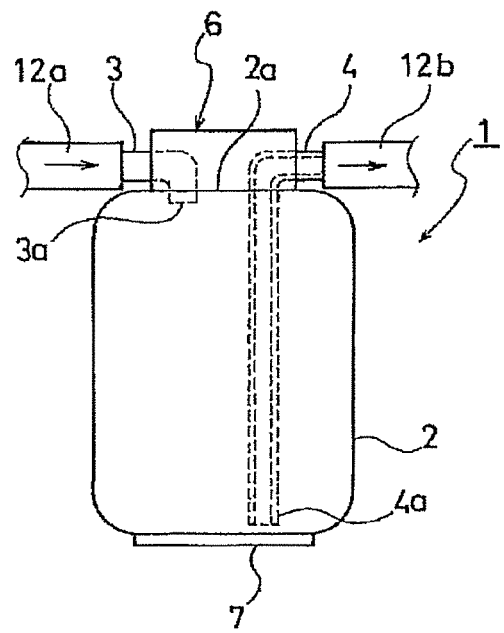
FIG. 9 is a schematic view of a flat tire sealant storage container according to still another embodiment of the present invention.

FIG. 9 shows an embodiment corresponding to that shown in FIG. 2, in which a container 1 is set upright while a cap 6 is disposed on the upper side of the container 1. In this embodiment, the hook-and-loop fastener 7 is attached to a bottom surface of the container 1, and an air inflow section 3 and a sealant discharge section 4 are equipped with the cap 6. Out of the air inflow section 3 and sealant discharge section 4 thus provided, the sealant discharge section 4 needs to have its inlet 4a extend to the lower part of the container 1.

Figure 10:
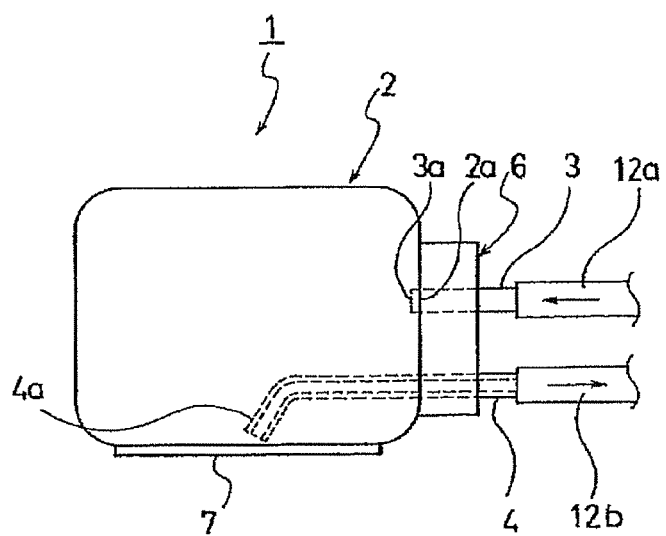
FIG. 10 is a schematic view of a flat tire sealant storage container according to still another embodiment of the present invention.

FIG. 10 shows an embodiment corresponding to that shown in FIG. 3, in which a container 1 is transversely disposed. In this embodiment, a hook-and-loop fastener 7 is secured to a side surface of a main body 2, and, out of an air inflow section 3 and a sealant discharge section 4 equipped with the cap 6, the sealant discharge section 4 needs to have its inlet 4a positioned at a lower part of the transversely disposed main body 2 of the container.

In either case, the air inflow section 3 and the sealant discharge section 4 may be provided in any positions, whereas the inlet 4a of the sealant discharge section 4 needs to be always positioned at the inner lower part of the container 1.

Each of the embodiments shown in FIGS. 4 to 6 in which the sucker 5 is provided as the fixing device may have the same configuration also when the hook-and-loop fastener 7 is provided as the fixing device, thereby enabling the main body 2 and the cap 6 to be reliably secured to each other.

When the hook-and-loop fastener 7 is provided as the fixing device, a shape and a size of the hook-and-loop fastener 7 are not particularly limited as long as the hook-and-loop fastener can secure the container 1. At least one hook-and-loop fastener 7 may be provided, but multiple hook-and-loop fasteners may be used to secure the container.

The hook-and-loop fastener used in the present invention is configured so that the hook-and-loop fastener 7 provided on the container 1 and a hook-and-loop fastener 7' provided on the external object are paired up. More specifically, a hook fastener having many projecting monofilament hooks implanted on one side of a fabric is paired up with a loop fastener having many projecting loops implanted on one side of a fabric, the loops being made of multifilament synthetic fibers. The hooks of the hook fastener and the loops of the loop fastener are detachably engaged with each other. This pair of hook-and-loop fasteners is used in such a manner that, when one hook-and-loop fastener 7 is attached to the container 1, the other hook-and-loop fastener 7' is attached to the external object C, as in the case of a flat tire repair device shown in FIG. 3 to be described later. When the hook-and-loop fastener 7 on the container 1 is used as the hook fastener, the hook-and-loop fastener 7' on the external object C is used as the loop fastener. On the other hand, when the hook-and-loop fastener 7 on the container 1 is used as the loop fastener, the hook-and-loop fastener 7' on the external object C is used as the hook fastener.

It is preferable that portions, of the container 1 and the external object, where the hook-and-loop fasteners are provided are flat surfaces. Although the hook-and-loop fasteners can be attached to each other even when the portions where the hook-and-loop fasteners are provided are not flat surfaces, an area of contact between the hook-and-loop fasteners is increased with the flat surfaces. Accordingly, the container 1 can be more firmly and stably secured to the external object. Therefore, the hook-and-loop fastener may be provided on the top surface of the cap 6 as shown in FIG. 8 or the bottom surface of the container 1 as shown in FIG. 9.

When the hook-and-loop fastener 7 is provided on the top surface of the cap 6, the container 1 can be combined with a cap 6 formed separately therefrom and having the air inflow section 3, the sealant discharge section 4 and the hook-and-loop fastener 7 which are integrated therein. This configuration is preferable because it can reduce the manufacturing cost of the flat tire sealant storage container.

Figure 11:
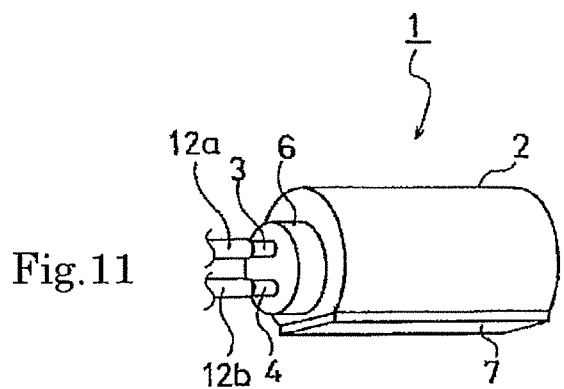
FIG. 11 is a perspective view showing a modified example of the flat tire sealant storage container according to the embodiment shown in FIG. 10.

When the hook-and-loop fastener 7 is provided in a round portion such as the side surface of the container 1, the side surface of the container 1 may be partially formed to be flat as in the case of an embodiment shown in FIG. 11. Thereby, an engagement area of the hook-and-loop fastener 7 can be increased.

FIG. 12 is a schematic view showing a flat tire repair device 11 (a flat tire repair kit) in the case where the container 1 including the sucker 5 as the fixing device is used among the flat tire sealant storage containers described above. In this flat tire repair device 11, a compressor C is used as the external object to which the container 1 is to be secured.

A surface of the compressor C is formed into a smooth surface 13, and the container 1 is secured upright onto the smooth surface 13 by the sucker 5. The air inflow section 3 is connected to the compressor C through a hose 12a, and a hose 12b is attached to the sealant discharge section 4. When the other end of the hose 12b is connected to a valve B of the flat tire T and compressed air is supplied from the compressor C, the compressed air is supplied to the air inflow section 3 through the hose 12a and is injected under pressure into the lower part of the main body 2 of the container 1. The compressed air injected under pressure into the flat tire sealant in the main body 2 rises above the fluid surface of the flat tire sealant and applies pressure on the fluid surface. The pressure of the compressed air pushes the flat tire sealant in the main body 2 out into the hose 12b from the sealant discharge section 4 in the lower part, thereby injecting the flat tire sealant into the tire T through the air inflow valve B. The injected flat tire sealant seals a puncture hole in the tire T by flowing into the puncture hole. After all the flat tire sealant flows in, further injection of the compressed air allows the air pressure of the tire to reach a predetermined level.

Generally, in the use of the flat tire repair device, there is not necessarily the external object having a smooth surface on the periphery. Since the compressor C is mounted on the vehicle as a part of the flat tire repair device 11, the provision of the smooth surface on the outer wall of the compressor C as described above enables the container 1 to be stably secured by the sucker 5, thereby enabling flat tire repair work to be performed under any circumstances. That is, securing of the container 1 onto the compressor C by means of the sucker 5 enables the container 1 to be stably maintained even when the compressor C is placed on an inclined road surface or a rough road.

Figure 13:
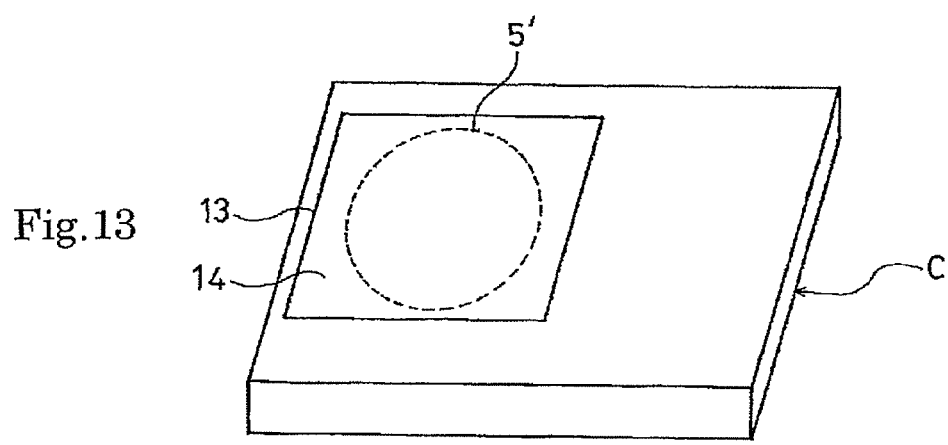
FIG. 13 is a perspective view of a compressor according to an embodiment of the present invention.

When the outer wall of the compressor C is not smoothly formed, a smooth surface may be formed by attaching a separately prepared sticker 14 made of a smooth material, or the like as illustrated in FIG. 13. The attachment of the sticker 14 as described above is preferable because the smooth surface 13 can be easily formed at any desired position just by attaching the sticker 14.

Figure 14:
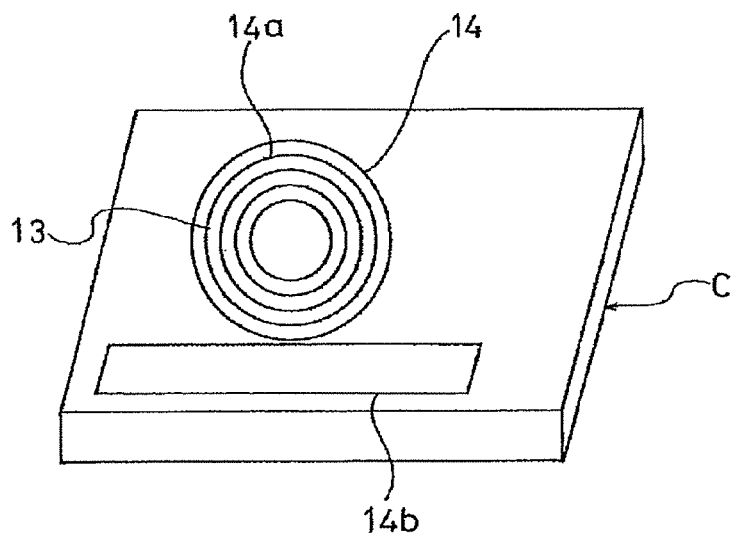
FIG. 14 is a perspective view of a compressor according to another embodiment of the present invention.

The sticker 14 may be in solid color or may have a pattern 14a or a sentence 14b displayed on the surface thereof as shown in FIG. 14. Specifically, the pattern 14a or the sentence 14b indicates a securing position of the container 1 so that a user can properly recognize the securing position of the container 1.

Figure 15:
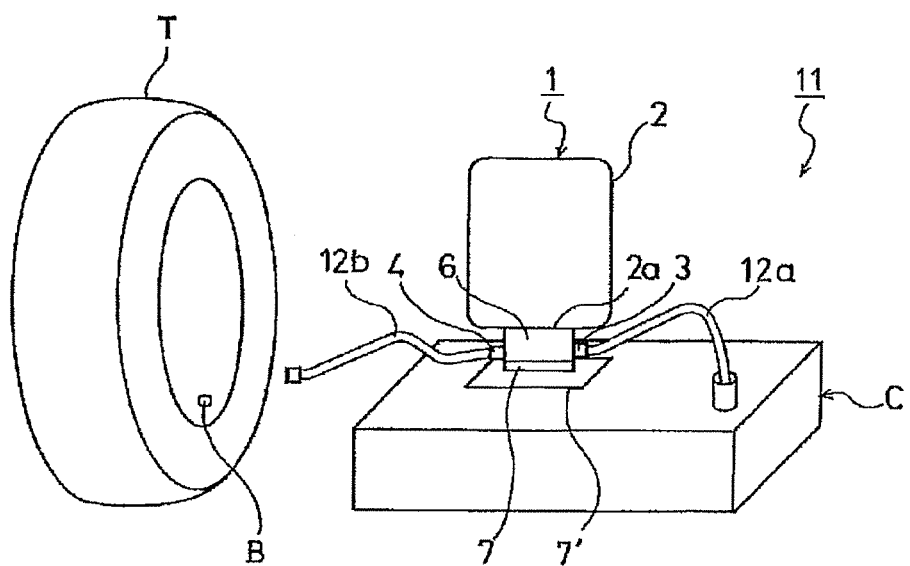
FIG. 15 is a schematic view showing a usage state of a flat tire repair device according to another embodiment of the present invention.

FIG. 15 shows a flat tire repair device 11 in the case where the container 1 including the hook-and-loop fastener 7 as the fixing device is used among the flat tire sealant storage containers described above.

As in the case of FIG. 12, the external object is a compressor C. The container 1 is secured upright by connecting the hook-and-loop fastener 7 provided on the container 1 and the hook-and-loop fastener 7' provided on the upper surface of the compressor C to each other as a pair. The air inflow section 3 is connected to the compressor C through a hose 12a, and a hose 12b is attached to the sealant discharge section 4. As in the case of FIG. 12, when compressed air is supplied from the compressor C after the hose 12b is connected to a valve B of the flat tire T, the compressed air is supplied to the air inflow section 3 through the hose 12a and is injected under pressure into the main body 2 of the container 1 from the air inflow section 3. The compressed air rises within the flat tire sealant in the main body 2 and then applies pressure on the fluid surface of the flat tire sealant. The pressure of the compressed air pushes the flat tire sealant in the main body 2 out into the hose 12b from the sealant discharge section 4, thereby allowing the flat tire sealant to flow into the tire T through the air inflow valve B.

Figure 16:
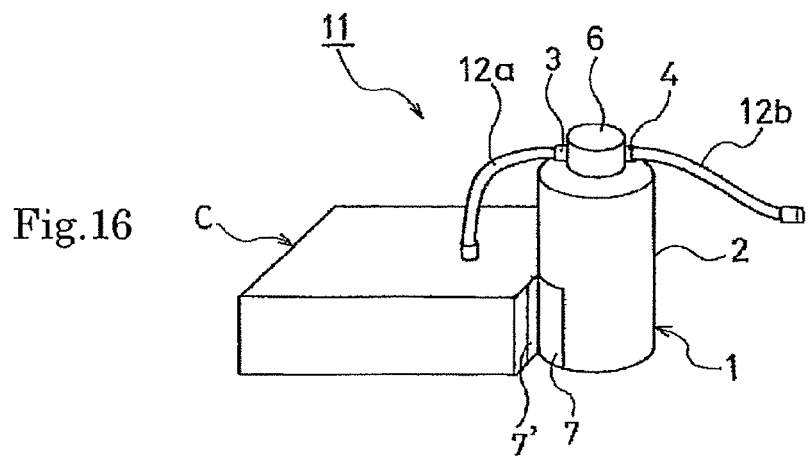
FIG. 16 is a schematic view showing a usage state of a flat tire repair device according to still another embodiment of the present invention.

The securing position of the container 1 on the external object is not limited to the position on the compressor C as shown in FIG. 15, but the container may be secured to the side surface of the compressor C as shown in FIG. 16. In this case, the hook-and-loop fastener 7 is attached to the side surface of the container, and the hook-and-loop fastener 7' is attached to the side surface of the compressor C.

When the hook-and-loop fasteners 7 and 7' are used as the fixing device, it is preferable that the hook-and-loop fasteners 7 and 7' are attached and secured in advance onto the container 1 and the compressor C by using an adhesive agent or a viscous agent. However, the flat tire repair device 11 is used in various environments. Therefore, as for the viscous agent, the viscosity of a highly temperature dependent viscous agent, if used, may decrease under low temperature or high temperature. For this reason, the adhesive agent rather than the viscous agent is preferably used.

It is preferable that areas A and A' of the hook-and-loop fasteners 7 and 7' satisfy the relationship of $A' \geqq A \geqq (W/F)^2$ with respect to the weight W of the container containing the sealant and the peel strength F of the hook-and-loop fasteners. The peel strength F varies depending on the kind of the hook-and-loop fastener and combination of the hook fastener and loop fastener. Accordingly, a minimum area in which the container can be secured can be obtained based on the kind of the hook-and-loop fasteners and the weight of the container.

For example, when the peel strength F is 214 g/cm and the weight of the container is 1 kg, the container can be secured in a square area 4.67 cm on a side. Accordingly, the area may be 4.67 cm square, i.e., 21.8 $cm^2$ or more.

The hook-and-loop fastener 7 on the container and the hook-and-loop fastener 7' on the external object may be formed to have the same shape and the same area. However, it is preferable that the area A' of the hook-and-loop fastener 7' on the compressor C is increased so that the hook-and-loop fastener 7' includes the hook-and-loop fastener 7 on the container 1. The joint strength between the hook-and-loop fasteners 7 and 7' is increased as the attachment area therebetween is increased. Accordingly, when the hook-and-loop fasteners 7 and 7' have the same area, the hook-and-loop fasteners 7 and 7' need to be carefully attached to each other so that facing surfaces thereof correspond to each other. However, this cumbersome attachment work may be simplified by setting the area A' of the hook-and-loop fastener 7' on the compressor C larger than the area A of the hook-and-loop fastener 7 on the container, resulting in a situation where the hook-and-loop fastener 7 may be attached to any position within the surface of the hook-and-loop fastener 7'.

Figure 17A:
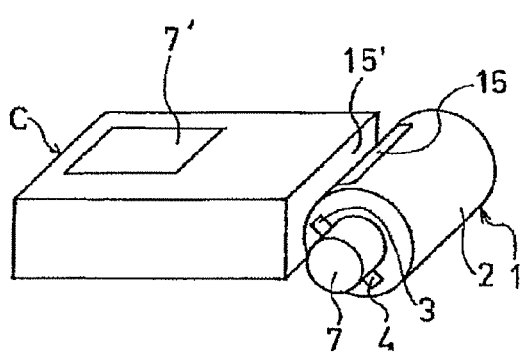
FIGS. 17 and 17B are explanatory views showing a positional relationship between a hook-and-loop fastener and a hook-and-loop fastener for storage.
Figure 17B:
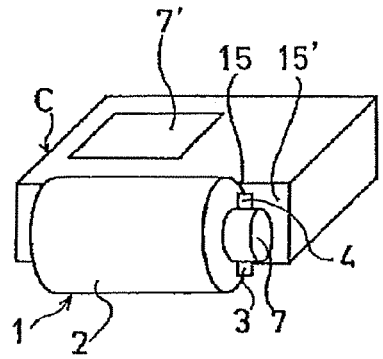
Figure 18:
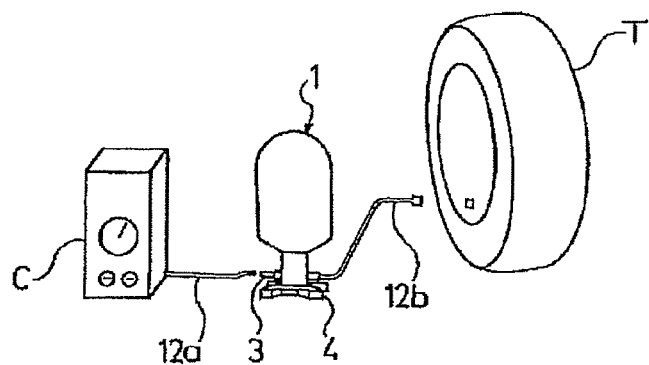
FIG. 18 is a schematic view showing a conventional flat tire repair device.

Although it does not matter how the flat tire repair device 11 is stored, the container 1 and the compressor C are stored together to clarify the use thereof as the kit. It is also preferable that the container and the compressor are stored in a state of being attached to each other using the hook-and-loop fasteners. As a more preferable method for such storage, second hook-and-loop fasteners for storage 15 and 15' are provided separately from the pair of hook-and-loop fasteners 7 and 7' provided on the container 1 and the compressor C, as shown in FIGS. 17A and 17B. Furthermore, provision of the hook-and-loop fasteners for storage 15 and 15' at different positions from those of the hook-and-loop fasteners 7 and 7' enables the container 1 and the compressor C to be stored while being attached to each other in a positional relationship which minimizes the overall size.

In the example shown in FIGS. 17A and 17B, the hook-and-loop fastener for storage 15 is attached to the side surface of the container 1, and the hook-and-loop fastener for storage 15' is attached to the side surface of the compressor C along the longitudinal direction thereof. Since the height of the compressor C and the diameter of the container 1 are set to be approximately the same, the container 1 can be compactly stored, while being transversely disposed, along the longitudinal direction of the side surface of the compressor C. The attachment positions of the hook-and-loop fasteners for storage 15 and 15' may be set depending on the shapes of the container 1 and the compressor C, without being limited to the case shown in FIGS. 17A and 17B, so that the container 1 and the compressor C are combined in a shape that minimizes the overall size.

When the two pairs of hook-and-loop fasteners 7 and 7' and 15 and 15' are provided to the container 1 and the compressor C as described above, the user may connect different pairs of hook-and-loop fasteners to each other. To prevent this erroneous attachment, it is preferable that the hook-and-loop fasteners 7 and 7' for use in flat tire repair and the hook-and-loop fasteners for storage 15 and 15' are attached to the container 1 and the compressor C in such a manner that the combination of the hook fasteners and the loop fasteners is set in reverse relationship to each other therebetween. In other words, when the hook-and-loop fastener 7 on the container 1 is used as the loop fastener and the hook-and-loop fastener 7' on the compressor C is used as the hook fastener as the hook-and-loop fasteners 7 and 7' for use in flat tire repair, the hook-and-loop fastener for storage 15 on the container 1 is used as the hook fastener and the hook-and-loop fastener for storage 15' on the compressor C is used as the loop fastener as the hook-and-loop fasteners for storage 15 and 15'. On the other hand, when the hook-and-loop fastener 7 on the container 1 is used as the hook fastener and the hook-and-loop fastener 7' on the compressor C is used as the loop fastener as the hook-and-loop fasteners 7 and 7' for use in flat tire repair, the hook-and-loop fastener for storage 15 on the container 1 is used as the loop fastener and the hook-and-loop fastener for storage 15' on the compressor C is used as the hook fastener as the hook-and-loop fasteners for storage 15 and 15'.

Since the loop fasteners or the hook fasteners are not engaged with each other, such combinations can prevent the erroneous attachment. Furthermore, the pair of hook-and-loop fasteners 7 and 7' for use in flat tire repair and the pair of hook-and-loop fasteners for storage 15 and 15' may be formed in different colors and/or different shapes, and may be attached in pairs of the same color or the same shape, thereby clarifying the combinations.

What is claimed is:

1. A flat tire sealant storage container comprising:
a main body defining an interior space that is filled with a flat tire sealant;
an air inflow pipe for injecting compressed air under pressure into the main body;
a sealant discharge pipe for discharging the flat tire sealant under pressure from the main body, the sealant discharge pipe having an inlet in fluid communication with the interior space of the main body; and
a fixing device coupled to an exterior part of the main body, the fixing device being configured to be attached to an external object in a detachable manner such that the inlet of the sealant discharge pipe is positioned at an inner lower part of the flat tire sealant storage container while the flat tire sealant storage container is secured to the external object by the fixing device and the flat tire sealant storage container is in a usage state;
the main body including a cap detachably attached over an opening of the main body, the air inflow pipe, the sealant discharge pipe and the fixing device being attached to the cap;
the leading end of the outlet of the air inflow pipe including a spring hook, and the leading end of the inlet of the sealant discharge pipe including a spring hook; and
the spring hooks being engaged with an engagement groove provided in an inner wall of the main body upon the cap being fitted over the opening of the main body.

2. The flat tire sealant storage container according to claim 1, wherein
the fixing device is provided on a lower side of the main body with respect to the usage state of the flat tire sealant storage container.

3. The flat tire sealant storage container according to claim 1, wherein
the cap includes a spring hook that is engaged with an engagement groove provided in an outer wall defining the opening of the main body upon the cap being fitted over the opening of the main body.

4. A flat tire sealant storage container comprising:
a main body defining an interior space that is filled with a flat tire sealant;
an air inflow pipe for injecting compressed air under pressure into the main body;
a sealant discharge pipe for discharging the flat tire sealant under pressure from the main body, the sealant discharge pipe having an inlet in fluid communication with the interior space of the main body; and
a fixing device coupled to an exterior part of the main body, the fixing device being configured to be attached to an external object in a detachable manner such that the inlet of the sealant discharge pipe is positioned at an inner lower part of the flat tire sealant storage container while the flat tire sealant storage container is secured to the external object by the fixing device and the flat tire sealant storage container is in a usage state;
the main body including a cap detachably attached over an opening of the main body, the air inflow pipe, the sealant discharge pipe and the fixing device being attached to the cap; and
a sealing film sealing the opening of the main body such that the cap overlies an exterior facing side of the sealing film;
a leading end of an outlet of the air inflow pipe and a leading end of the inlet of the sealant discharge pipe being each angled such that the leading end of the outlet and the leading end of the inlet break the sealing film upon the cap being fitted over the opening of the main body;
the leading end of the outlet of the air inflow pipe including a spring hook, and the leading end of the inlet of the sealant discharge pipe including a spring hook, and
the spring hooks being engaged with an engagement groove provided in an inner wall of the main body upon the cap being fitted over the opening of the main body.

5. The flat tire sealant storage container according to claim 1, wherein
the fixing device is a sucker attaching to the external object using suction.

6. The flat tire sealant storage container according to claim 1, wherein
the fixing device includes a hook-and-loop fastener.

7. The flat tire sealant storage container according to claim 6, wherein
the hook-and-loop fastener is provided on a flat surface.

8. A flat tire repair device comprising:
a flat tire sealant storage container including
a main body defining an interior space that is filled with a flat tire sealant;
an air inflow pipe for injecting compressed air under pressure into the main body;
a sealant discharge pipe for discharging the flat tire sealant under pressure from the container, the sealant discharge pipe having an inlet in fluid communication with the interior space of the main body; and
a fixing device coupled to an exterior part of the main body, the fixing device being configured as a sucker to be attached to an external object in a detachable manner using suction such that the inlet of the sealant discharge pipe is positioned at an inner lower part of the container while the flat tire sealant storage container is secured to the external object by the fixing device and the flat tire sealant storage container is in a usage state; and
a compressor for injecting compressed air under pressure into the air inflow pipe, the compressor having a case with a smooth outer surface formed of a sticker made of a smooth material being attached to the case of the compressor, with the sucker being detachably secured to the smooth outer surface of the case of the compressor.

9. The flat tire repair device according to claim 8, wherein the sticker includes indicia indicating a fixing position of the sucker on the case of the compressor.

10. A flat tire repair device comprising:
a flat tire sealant storage container including
a main body defining an interior space that is filled with a flat tire sealant;
an air inflow pipe for injecting compressed air under pressure into the main body;
a sealant discharge pipe for discharging the flat tire sealant under pressure from the container, the sealant discharge pipe having an inlet in fluid communication with the interior space of the main body; and a fixing device coupled to an exterior part of the main body, the fixing device being configured to be attached to an external object in a detachable manner such that the inlet of the sealant discharge pipe is positioned at an inner lower part of the container while the flat tire sealant storage container is secured to the external object by the fixing device and the flat tire sealant storage container is in a usage state; and a compressor for injecting compressed air under pressure into the air inflow pipe;

the fixing device including a hook-and-loop fastener, the hook-and-loop fastener having a first part disposed on a surface of the flat tire sealant storage container, and a second part of the hook-and-loop fastener disposed on an outer surface of a case of the compressor;

the flat tire sealant storage container including an additional hook-and-loop fastener part that cooperates with an additional hook-and-loop fastener part provided on the case of the compressor for storage, the additional hook-and-loop fastener parts being provided on a side surface of the flat tire sealant storage container and a side surface of the case of the compressor, respectively.

11. The flat tire repair device according to claim 10, wherein
the additional hook-and-loop fastener parts for storage have a reverse relationship with respect to the first and second parts of the hook-and-loop fastener forming fixing device such that the additional hook-and-loop fastener part of the flat tire sealant storage container does not cooperate with the second part of the hook-and-loop fastener on the case of the compressor.

12. The flat tire sealant storage container according to claim 1, wherein
the fixing device is provided on a lower side of the cap with respect to the usage state of the flat tire sealant storage container.

13. The flat tire sealant storage container according to claim 12, wherein
the inlet of the sealant discharge pipe faces in a direction that is away from the cap.

14. The flat tire sealant storage container according to claim 13, wherein
the air inflow pipe includes a leading end that is disposed within the interior space of the main body with the leading end of the air inflow pipe having an outlet facing in a direction that is away from the cap.

15. The flat tire sealant storage container according to claim 12, wherein
the fixing device is a sucker attaching to the external object using suction.

* * * * *